(No Model.)
J. C. FRENCH.
PAVEMENT OR FLOOR LIGHT.
No. 445,311. Patented Jan. 27, 1891.
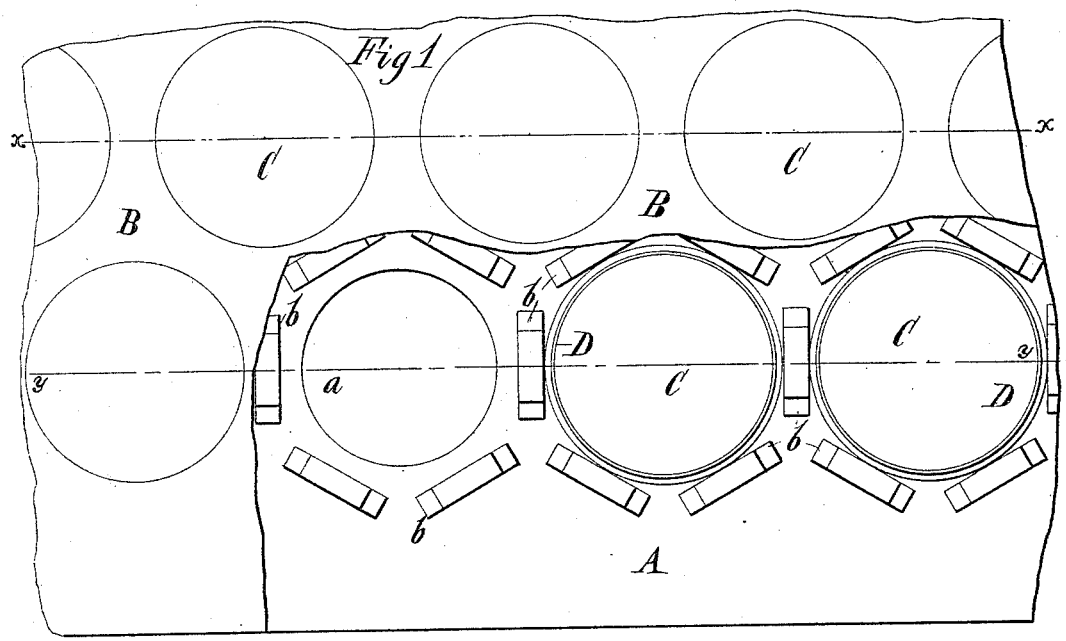
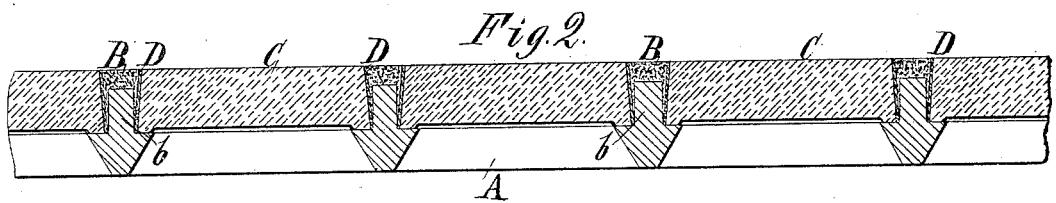
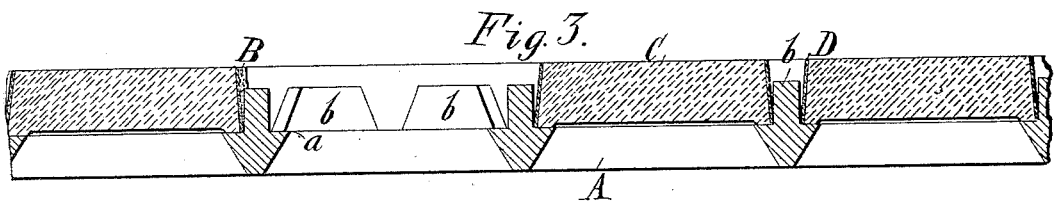
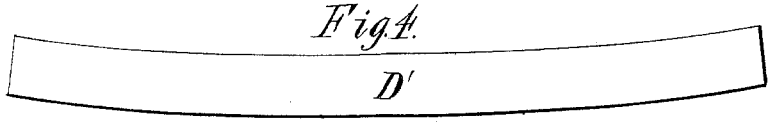
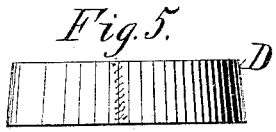
Witnesses:
John Birket
C. L. Sundgren
Inventor:
James C. French
by his Attorneys
Brown & Griswold

UNITED STATES PATENT OFFICE.

JAMES C. FRENCH, OF BROOKLYN, NEW YORK.

PAVEMENT OR FLOOR LIGHT.

SPECIFICATION forming part of Letters Patent No. 445,311, dated January 27, 1891.

Application filed July 9, 1889. Serial No. 316,917. (No model.)

*To all whom it may concern:*

Be it known that I, JAMES C. FRENCH, of Brooklyn, in the county of Kings and State of New York, have invented a certain new and useful Improvement in Pavement or Floor Lights, of which the following is a specification.

My invention relates to glazed pavements or floors through which light is admitted to vaults or apartments beneath, and in which pieces of glass called "lenses" are placed upon a cast-iron grating, bed-plate, or frame over openings therein and bedded in cement thereon.

I will describe in detail a pavement or floor light embodying my improvement, and then point out the novel features in the claim.

Figure 1 is a plan or top view of a portion of the pavement or floor light embodying my improvement. Fig. 2 is a vertical section of the same, taken on the line $x\,x$, Fig. 1. Fig. 3 is a similar view taken on the line $y\,y$, Fig. 1. Fig. 4 is a view of one of a number of rubber bands which I employ extended. Fig. 5 is a view of the same with the ends of the band joined together, so as to form a ring. In Fig. 1 I have shown a portion of the cement in which the lenses are embedded as removed to more clearly disclose the structure beneath it.

Similar letters of reference designate corresponding parts in all the figures.

A designates a metallic plate or grating for a pavement or floor. This plate or grating is provided with perforations $a$. Between the perforations $a$ are upwardly-extending lugs or projections $b$, which serve as anchors for a body of hard cement B, which is placed upon the upper side of the plate or grating A. Such cement is placed between a number of glass lenses C, which lenses when in position are over the perforations $a$ in the plate A and rest upon their lower sides on the metal of the plate A, surrounding said perforations. The projections $b$ in the example of my improvement surround certain of said lenses when the latter are in position.

It will be observed that the lenses C are upwardly tapering, or, in other words, are of greater diameter at their lower ends than at their upper ends.

In order to allow for the expansion and contraction of the lenses due to the varieties of temperature, I surround each of the lenses with an elastic ring D, which ring is made of india-rubber. In making the ring I prefer to cut the strip D' of rubber, from which the ring is formed, so that it is slightly curved in the direction of its length, as shown more clearly in Fig. 4. When thus cut and the ends of the strip are brought together and secured, as shown in Fig. 5, the said ring will have an upward taper corresponding approximately to the taper of the lenses. The bands are painted or otherwise colored light upon the sides next the lenses. This tends to increase the light-giving capacity of the lenses, as they are not darkened about their edges. The rubber rings D having been placed about the lenses C, as shown more clearly in Figs. 2 and 3, the lenses are placed in position over the perforations $a$, and the spaces between the lenses are then filled in with the cement B, which latter is preferably a hard cement.

By my improvement I provide a very simple, durable, and inexpensive means for compensating for the expansion and contraction of the lenses due to varieties in temperature, as the rubber ring not only yields readily to such expansion and contraction, but being embedded in the cement it is prevented from contact with the atmosphere, and is consequently practically indestructible.

Wherever throughout the specification I have used the term "rubber" I wish to be understood as meaning a fabric composed wholly or partly of india-rubber, as obviously india-rubber combined with fibrous material—such as cloth—might be used.

What I claim as my invention, and desire to secure by Letters Patent, is—

The herein-described pavement or floor light, consisting of a perforated supporting-frame provided with retaining-lugs extending upwardly about the perforations, lenses resting over the perforations on the frame, surrounding the perforations, fibrous rubber bands provided with light-colored faces adjacent to the peripheries of the lenses, the said bands being located about the lenses between their peripheries and the retaining-lugs, and hard cement filled in between the lugs and rubber bands up to a level with the upper edges of the lenses, substantially as set forth.

JAMES C. FRENCH.

Witnesses:
FREDK. HAYNES,
D. H. HAYWOOD.